(12) United States Patent
Engerman

(10) Patent No.: US 11,933,389 B1
(45) Date of Patent: Mar. 19, 2024

(54) MULTI-SPEED GEARBOX AND GEARBOX OPERATING METHOD

(71) Applicant: Dana Automotive Systems Group, LLC, Maumee, OH (US)

(72) Inventor: Eric M. Engerman, Plymouth, MI (US)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 0 days.

(21) Appl. No.: 18/172,210

(22) Filed: Feb. 21, 2023

(51) Int. Cl.
*F16H 3/62* (2006.01)
*B60K 17/08* (2006.01)

(52) U.S. Cl.
CPC ............... *F16H 3/62* (2013.01); *B60K 17/08* (2013.01); *F16H 2200/0021* (2013.01); *F16H 2200/0043* (2013.01); *F16H 2200/2007* (2013.01); *F16H 2200/2035* (2013.01); *F16H 2200/2064* (2013.01); *F16H 2200/2069* (2013.01); *F16H 2200/2084* (2013.01); *F16H 2200/2094* (2013.01)

(58) Field of Classification Search
CPC ............... F16H 3/62; F16H 2200/0021; F16H 2200/0043; F16H 2200/2007; F16H 2200/2035; F16H 2200/2064; F16H 2200/2069; F16H 2200/2084; F16H 2200/2094; B60K 17/08
See application file for complete search history.

(56) References Cited

U.S. PATENT DOCUMENTS

| | | | |
|---|---|---|---|
| 10,630,140 B2 | 4/2020 | Pritchard et al. | |
| 2006/0030447 A1* | 2/2006 | Kita | F16H 37/022 475/210 |
| 2020/0072321 A1* | 3/2020 | Kim | F16H 3/66 |
| 2020/0149612 A1 | 5/2020 | Rippelmeyer | |
| 2020/0282973 A1* | 9/2020 | Kasahara | F16H 63/48 |
| 2021/0164553 A1 | 6/2021 | Trautmann et al. | |
| 2021/0404536 A1 | 12/2021 | Schlittenbauer et al. | |

FOREIGN PATENT DOCUMENTS

| | | | | |
|---|---|---|---|---|
| JP | H10311388 A | * | 11/1998 | |
| WO | WO-2021062458 A1 | * | 4/2021 | F16H 3/663 |

* cited by examiner

*Primary Examiner* — Justin Holmes
(74) *Attorney, Agent, or Firm* — McCoy Russell LLP

(57) ABSTRACT

Multi-speed gearbox systems and methods. A multi-speed gearbox, in one example, includes a planetary assembly with a first gear set rotationally coupled to a second gear set. The multi-speed gearbox further includes a first clutch configured to selectively couple a first sun gear of the first gear set to an input shaft configured to rotationally couple to an electric machine and a second clutch configured to selectively couple a first sun gear of the second gear set to an output shaft.

18 Claims, 5 Drawing Sheets

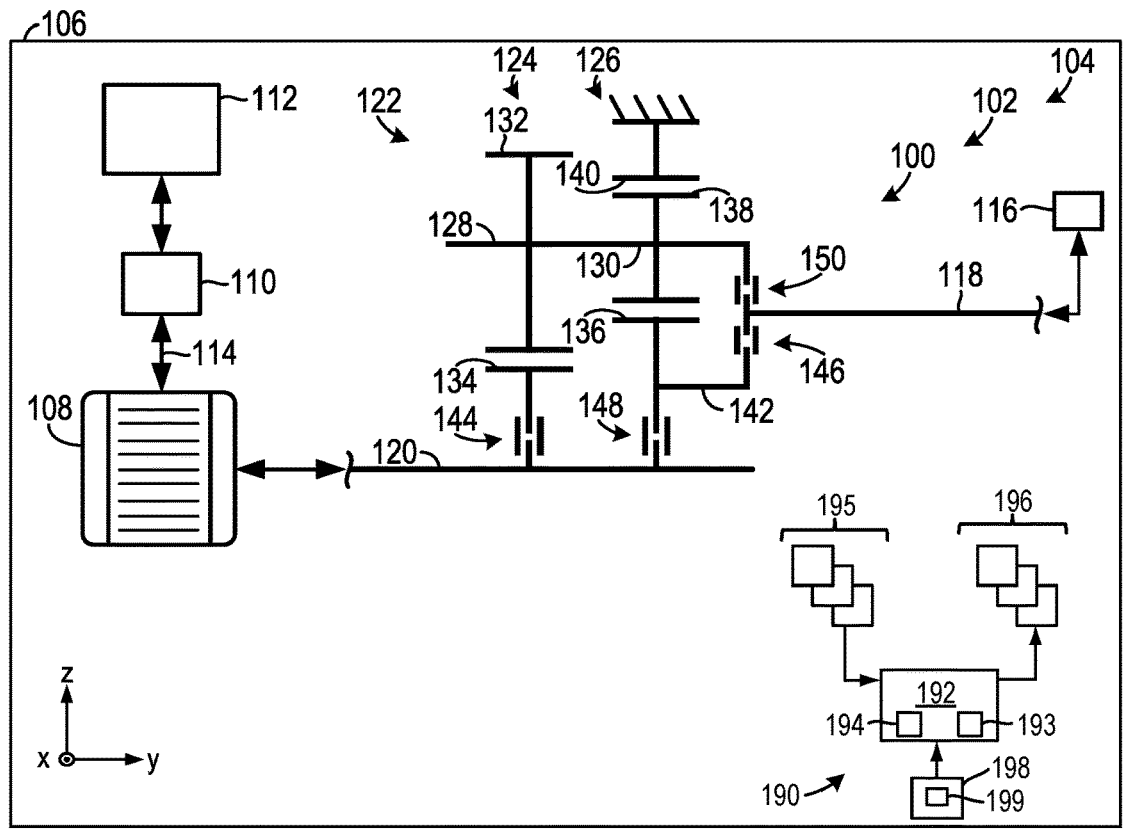

FIG. 1A

| | First Gear | Second Gear | Third Gear | Fourth Gear |
|---|---|---|---|---|
| First Clutch (144) | Engaged | Disengaged | Engaged | Disengaged |
| Second Clutch (146) | Disengaged | Disengaged | Engaged | Engaged |
| Third Clutch (148) | Disengaged | Engaged | Disengaged | Engaged |
| Fourth Clutch (150) | Engaged | Engaged | Disengaged | Disengaged |

FIG. 1B

| | Ratio |
|---|---|
| First Gear | [(planet gears 132)/(planet gears 138)]*[(ring gear 140)/(sun gear 134)] +1 |
| Second Gear | [(ring gear 140)/(sun gear 136)] +1 |
| Third Gear | ([(planet gears 132)/(planet gears 138)]*[(ring gear 140)/(sun gear 134)] +1)/([(ring gear 140)/(sun gear 134)] +1) |
| Fourth Gear | 1:1 |

MULTI-SPEED GEARBOX AND GEARBOX OPERATING METHOD

TECHNICAL FIELD

The present disclosure relates to a multi-speed gearbox with a planetary assembly that includes a first gear set and a second gear set.

BACKGROUND AND SUMMARY

Multi-speed transmissions have been used in electrified powertrains in an attempt to increase motor efficiency and the transmission's tractive performance. Multi-speed transmission may be beneficial in heavy duty vehicles and particularly in vehicle platforms in which smoother shifts are desired, such as in passenger vehicles, for instance. When compared to transmissions receiving motive input from internal combustion engines, electric transmissions are capable of having larger gear separations due to the capabilities of electric motors particularly with regard to their power bands.

US 2020/0149612 A1 to Rippelmeyer teaches a transmission with a compound planetary gear set. In Rippelmeyer's transmission clutches allow power to be transferred from an input to sun gears in each of the steps in the compound planetary gear set.

The inventor has recognized several drawbacks with Rippelmeyer's transmission as well as other previous transmissions. The compound planetary gear set and the associated clutches may be space inefficient, complex, and costly to manufacture. However, other transmissions that have fewer operating gears have exhibited wide gear ratio spreads, which can cause or exacerbate torque interruptions during shifting transients. To elaborate, the constraints of certain clutches and their material construction may demand relatively small gear steps to achieve smoother shifting. Still further, other transmissions that employ planetary gear sets, particularly those which utilize Ravigneaux type gear sets, can exhibit high ring gear speeds. The high ring gear speed increases the likelihood of gear degradation.

The inventor has developed a multi-speed transmission to at least partially resolve the aforementioned issues. The multi-speed transmission, in one example, includes a planetary assembly with a first gear set rotationally coupled to a second gear set. The multi-speed gearbox further includes a first clutch configured to selectively couple a first sun gear of the first gear set to an input shaft that is configured to rotationally couple to an electric machine. The multi-speed gearbox even further includes a second clutch configured to selectively couple a first sun gear of the second gear set to an output shaft. In this way, the transmission is able to achieve comparatively small gear ratio spreads in a compact package.

In one example, the multi-speed gearbox further includes a third clutch configured to selectively couple the input shaft to the second sun gear in the second gear set. In such an example, the multi-speed gearbox may further include a fourth clutch configured to selectively couple a carrier of the second gear set to the output shaft. Using four clutches with this architecture allows the gearbox to achieve at least four gear stages in a space efficient package.

In another example, a first carrier in the first gear set may be directly fixedly coupled to a second carrier in the second gear set. Further, in one example, a ring gear of the first gear set or the second gear set may be grounded. Designing the gears in the planetary assembly in this manner allows the gearbox's compactness to be further increased.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIG. 1A shows a multi-speed gearbox in a powertrain of a vehicle.

FIG. 1B shows a table with clutch configurations in the different operating gears of the gearbox, depicted in FIG. 1A.

FIG. 1C shows a table with exemplary gear ratio equations.

DETAILED DESCRIPTION

Figure 2A:
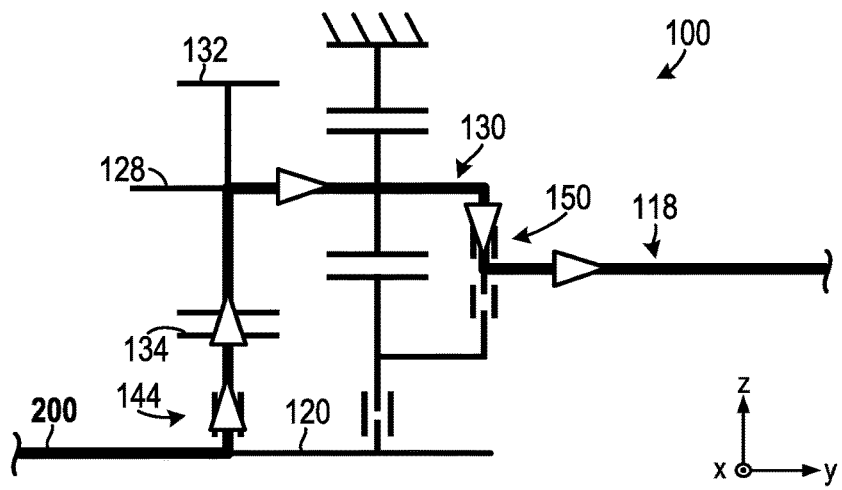
FIGS. 2A, 2B, 2C, and 2D show the power paths through the multi-speed transmission, depicted in FIG. 1A, in differential operational gear stages.

A multi-speed gearbox with a planetary assembly and multiple clutches that allow the gearbox to achieve closer jumps between numerical gear ratios in a compact package than other gearboxes such as gearboxes which utilize Ravigneaux gear sets. Further, the multi-speed gearbox may achieve these characteristics while maintaining a common rotational direction for each of the gears (avoiding the reversal of a traction motor to shift between drive gears, if desired). Further, to accomplish these characteristics, the planetary assembly includes a first gear set rotationally coupled to a second gear set and a one-way clutch which selectively connects an input shaft and a sun gear in the first gear set as well as another clutch which selectively connects a sun gear in the second gear set to an output shaft. The first and second gear sets may be referred to as a LuaE gearset assembly, in one example. Further, carriers in the first and second gear sets may be directly fixedly coupled to one another. In this way, the carrier in the second gear set is able to function as an input and an output in one of the gear stages. Consequently, the multi-speed gearbox is able to achieve a desired packaging efficiency and gear ratio separation, if desired.

FIG. 1A shows a multi-speed gearbox 100 that may be included in a system 102. The multi-speed gearbox 100 (e.g., multi-speed electric gearbox) may be included in a powertrain 104 of a vehicle 106. The powertrain 104 is an electric powertrain, in the illustrated example. The electric powertrain may specifically be an all-electric powertrain or a hybrid electric powertrain. An all-electric powertrain may be used due to its reduced complexity and therefore reduced points of potential component degradation in comparison to hybrid electric powertrains.

In the hybrid electric powertrain example, an internal combustion engine may be used to recharge an energy storage device 112 and/or drive one of the vehicle axles. Further, in alternate examples, the powertrain may be a powertrain with an internal combustion engine that generates motive power.

The vehicle 106 may for example be a medium or heavy duty vehicle, in one example. In such an example, the vehicle may be a passenger vehicle. However, the vehicle may be another suitable type of vehicle such as a light duty vehicle and/or a non-passenger type vehicle, in other examples.

The powertrain 104 includes an electric machine 108 (e.g., traction motor). In the illustrated example, the electric machine 108 is electrically coupled to an inverter 110 via an electrical connection (e.g., multi-phase wires, bus bars, combinations thereof, and the like). As such, the electric machine 108 is an alternating current (AC) type motor in the illustrated example. To elaborate, the electric machine may be a multi-phase (e.g., three, six, or nine phase) AC motor. In one specific use case example, the electric machine may be a three phase AC motor that is less costly and more efficient than single phase type motors. However, in alternate examples, a direct current (DC) traction motor may be used in the electric powertrain 104.

The inverter 110 may be electrically connected to an energy storage device 112 (e.g., one or more traction batteries, capacitor(s), fuel cell(s), combinations thereof, and the like). As such, electrical energy may flow between the inverter and the energy storage device during drive operation and regeneration operation, when the motor is designed as a motor-generator. The arrows 114 denote the electrical energy transfer between the electric machine 108, the inverter 110, and the energy storage device 112.

The electric powertrain 104 may further include one or more drive axle assemblies 116 that are mechanically coupled to an output shaft 118 which may be included in the multi-speed gearbox 100. The drive axle assemblies may specifically be a front drive axle assembly and a rear drive axle assembly, in one example. The drive axle assemblies may include differentials, axle shafts (e.g., half shafts) coupled to the associated differential, drive wheels coupled to the axle shafts), and the like. The drive wheels may be mounted on wheel hubs and may contact a driving surface while the vehicle is in operation.

The electric machine 108 may include components such as a rotor and a stator that electromagnetically interact during operation to generate motive power. Further in one example, the motor may be a motor-generator which is designed to generate electrical energy during regeneration operation.

The multi-speed gearbox 100 may include an input shaft 120 that is mechanically coupled (e.g., directly mechanically coupled) to a rotor shaft in the electric machine 108. The input shaft 120 may be directly coupled to the rotor shaft via splines or other suitable mechanical connection, in one example. However, in other examples, gears, shafts, chains, combinations thereof, and the like may be used to establish the connection between the gearbox and the motor. Inputs and outputs of the transmission generally denote the power flow occurring while the powertrain is operating under a drive condition where mechanical power is transferred from the traction motor to the drive wheels to propel the vehicle in a desired direction (e.g., a forward drive direction or a reverse drive direction). However, it will be appreciated that during regeneration operation, the mechanical power flow occurs in the reverse direction (i.e., from the drive wheels to the traction motor).

The multi-speed gearbox 100 further includes a planetary assembly 122 with a first gear set 124 that is rotationally coupled to a second gear set 126. In the illustrated example, the first gear set may be characterized as a simple stepped planetary and the second gear set may be a simple planetary. Still further, in one specific example, the planetary assembly may be referred to as a LuaE gearset.

Further, in the illustrated example, a carrier 128 in the first gear set 124 is directly rotationally coupled to a carrier 130 in the second gear set 126. However, the first and second gear sets may be rotationally coupled using other gears, in other examples. The first gear set 124 further includes planet gears 132 rotationally mounted on the carrier 128 and a sun gear 134. The sun gear 134 meshes with the planet gears 132. Further, in the illustrated example, the first gear set 124 does not include a ring gear which increasing gearbox compactness and reduces gearbox complexity. However, as expanded upon herein with regard to FIG. 3, the first gear set may include a ring gear.

In the illustrated example, the second gear set 126 includes a sun gear 136, planet gears 138 rotationally mounted on the carrier 130, and a ring gear 140. The ring gear 140 is permanently grounded in the illustrated example. Permanently grounding the ring gear allows the gearbox to achieve at least four gear ratios with reasonable spreads between the gears. Further, by permanently grounding the ring gear 140, the gear speeds in the gearbox are reduced when compared to a Ravigneaux gear set in which the ring gear speed would exceed 200 meters/second (m/s), in one use-case example. These high ring gear speeds results in very high circumferential forces which demand strict balancing targets. Conversely, the gearbox described herein allows the balancing targets in the planetary assembly to be relaxed, if desired, thereby simplifying gearbox manufacturing.

In an alternate example, the first gear set 124 may include a ring gear that is permanently grounded and meshes with the planet gears 132 and the ring gear 140 may be omitted from the second gear set 126. Thus, in this alternate example, the gearbox will have different numerical ratios but retain similar kinematics.

Further, a shaft 142 is coupled to the sun gear 136. The shaft 142 and the carrier 130 allow connection to the output shaft 118 to be varied, which is expanded upon herein. The output shaft 118 may be coupled to the one or more drive axle assemblies 116, as previously indicated.

The multi-speed gearbox 100 further includes multiple clutches that allow the gearbox to operate in multiple gear stages. To elaborate, the multi-speed gearbox 100 is specifically depicted as a four speed gearbox with four discrete gear stages. However, in alternate examples, the gearbox may include additional stages, as is expanded upon herein with regard to FIG. 3 or may include fewer gear stages, such as two or three stages.

In the illustrated example, a first clutch 144, in the multi-speed gearbox 100, is designed to, when engaged, couple the sun gear 134 to the input shaft 120 and when disengaged allow the input shaft 120 and the sun gear 134 to independently rotate. The first clutch 144 may be a one-way clutch (e.g., a sprag clutch), in one example. It will be understood that the one-way clutch freewheels when rotated in one direction and transfers torque therethrough in the opposite direction. In the sprag clutch example, the clutch may include an inner race fixedly coupled to the input shaft 120 or an extension of the input shaft, an outer race fixedly coupled to the sun gear 134, and multiple sprags between the inner and outer races. The other sprag clutches described herein may include similar constructions with regard to races and sprags. In other examples, the first clutch 144 may be a dog clutch, a friction clutch (e.g., a wet friction clutch), or a synchronizer which may however increase the complexity and size of the gearbox, in some cases. The dog clutches, synchronizers, and the friction clutches described herein may be actively controlled via electro-mechanical, hydraulic, and/or pneumatic actuators, for instance.

Further, in the illustrated example, a second clutch 146, in the multi-speed gearbox 100, is designed to when engaged rotationally couple the sun gear 136 to the output shaft 118 and when disengaged inhibit torque transfer between the sun gear 136 and the output shaft 118. The shaft 142 may specifically be coupled to the sun gear 136 and the second clutch 146. The second clutch 146 may be a one-way clutch, in one example. However, in other examples, the second clutch may be a dog clutch, a friction clutch (e.g., a wet friction clutch), or a synchronizer.

Still further, in the illustrated example, a third clutch 148, when engaged, allows torque transfer between the input shaft 120 and the sun gear 136 in the second gear set 126 and conversely when disengaged inhibits torque transfer between the input shaft 120 and the sun gear 136. The third clutch 148 may be a friction clutch (e.g., wet friction clutch) due to the third clutch experiencing higher speeds than the other clutches during gearbox operation. When the third clutch is a friction clutch, the clutch may include a first set of plates coupled to the input shaft 120 and a second set of plates coupled to the sun gear 136. Carriers (e.g., drums) may hold the plates and the sets of plates may be interleaved. During engagement a piston or other suitable actuator may induce frictional engagement of the sets of plates. The other friction clutches described herein may have a similar construction with regard to plates and actuators.

Still further, in the illustrated example, a fourth clutch 150, when engaged, enables torque transfer between the carrier 130 in the second gear set 126 and the output shaft 118 and when disengaged inhibits torque transfer therebetween. The fourth clutch 150 may be a friction clutch (e.g., wet friction clutch), in one example. However, in other examples, the third and/or fourth clutches may be dog clutches. Still further, in other examples, all of the clutches may be friction clutches or all of the clutches may be dog clutches. Even further in other examples, a portion of the clutches may be dog clutches and a portion of the clutches may be friction clutches. When the gearbox uses two one-way clutches and two friction clutches the gearbox is able to achieve a desired balance between space efficiency and shifting performance.

The powertrain 104 may further include a control system 190 with a controller 192 as shown in FIG. 1A. The controller 192 may include a microcomputer with components such as a processor 193 (e.g., a microprocessor unit), input/output ports, an electronic storage medium 194 for executable programs and calibration values (e.g., a read-only memory chip, random access memory, keep alive memory, a data bus, and the like). The storage medium may be programmed with computer readable data representing instructions that are executable by a processor for performing the methods and control techniques described herein as well as other variants that are anticipated but not specifically listed. As such, control techniques, methods, and the like expanded upon herein may be stored as instructions in non-transitory memory.

The controller 192 may receive various signals from sensors 195 coupled to various regions of the powertrain 104. For example, the sensors 195 may include a pedal position sensor designed to detect a depression of an operator-actuated pedal such as an accelerator pedal and/or a brake pedal, a speed sensor at the transmission output shaft, energy storage device state of charge (SOC) sensor, clutch position sensors, and the like. Motor speed may be ascertained from the amount of power sent from the inverter to the electric machine 108. An input device 198 (e.g., accelerator pedal, brake pedal, drive mode selector, gear selector 199, combinations thereof, and the like) may further provide input signals indicative of an operator's intent for vehicle control. The gear selector 199 may include discrete positions such as drive and reverse as well as first gear and second gear that allow an operator to place the transmission in a forward drive mode, a reverse drive mode, a first gear mode, a second gear mode, a third gear mode, and a fourth gear mode. It will be appreciated, that when an operator places the transmission in a forward drive mode, the transmission may then automatically trigger power shifts based on transmission speed and load.

Upon receiving the signals from the various sensors 195 of FIG. 1A, the controller 192 processes the received signals, and employs various actuators 196 of powertrain and/or transmission components to adjust the components based on the received signals and instructions stored on the memory of controller 192. For example, the controller 192 may receive an accelerator pedal signal indicative of an operator's request for increased vehicle acceleration. In response, the controller 192 may command operation of the inverter 110 to adjust the motor's mechanical power output and increase the power delivered from the electric machine 108 to the multi-speed gearbox 100. The controller 192 may, during certain operating conditions, be designed to send commands to the clutches 148 and 150, to carry out a shift where some of the clutches are engaged and disengaged. For instance, a control command may be sent to the clutch 148 and in response to receiving the command, an actuator in or coupled to the clutch may adjust the clutch based on the command for clutch engagement or disengagement. The other controllable components in the vehicle may function in a similar manner with regard to sensor signals, control commands, and actuator adjustment, for example.

An axis system is provided in FIG. 1A as well as FIGS. 2A, 2B, 2C, 2D, and 3, for reference. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples.

The electric machine 108 may be designed to spin the rotor shaft in opposing directions which correspond to forward and reverse drive. Therefore, in such an example, the multi-speed gearbox 100 may be designed to operate with an equal number of forward and reverse driving gear modes, in one example. However, in alternate examples, the transmission may have an asymmetric number of selectable forward and reverse gear ratios.

Further, the electric machine 108 may be spun in a common direction during a drive mode (e.g., forward or reverse drive mode) while the multi-speed gearbox operates in each of the gear stages as well as transitions between the gear stages. In this way, motor reversal during shifting transients may be avoided, simplifying shifting and reducing torque interruptions.

Further, the multi-speed gearbox 100 with the architecture depicted in FIG. 1A may not be capable of producing a ratio resulting in a speed increase. Therefore, the multi-speed gearbox may be suited for electric powertrains, many of which do not demand a gearbox gear ratio that increases speed.

FIG. 1B shows a table 160 that indicates the configurations of clutches 144, 146, 148, 150 in the first gear, the second gear, the third gear, and the fourth gear. In the first gear, the first clutch 144 and the fourth clutch 150 are engaged and the second clutch 146 and the third clutch 148 are disengaged. In the second gear, the third clutch 148 and the fourth clutch 150 are engaged and the first clutch 144 and the second clutch 146 are disengaged. In the third gear, the first clutch 144 and the second clutch 146 are engaged while the third clutch 148 and the fourth clutch 150 are disengaged. In the fourth gear, the first clutch 144 and the fourth clutch 150 are disengaged while the second clutch 146 and the third clutch 148 are engaged.

As discussed with regard to FIG. 1A, the first clutch 144 and the second clutch 146 may be one-way clutches and the third clutch 148 and the fourth clutch 150 may be friction clutches. Therefore, to enter into the different operating gears, the third and the fourth clutch may be actively controlled and the first and the second clutches passively engage and disengage based on the active control of the third and the fourth clutch. However, as previously discussed the first and/or second clutches may be actively controlled clutches such as friction clutches or dog clutches, in other examples.

FIG. 1C shows a table 170 with equations for gear ratio calculation in each of the discrete operating gears. However, it will be appreciated that the equations may vary for gearboxes where the architecture is varied. The sizing of each of the gears in the planetary assembly may be selected based on a variety of factors such as traction motor power band, traction motor size, traction motor peak continuous power, gearbox performance targets, vehicle weight, and the like. In one specific use-case example, the sun gear 134 may have a tooth count of 53, the sun gear 136 may have a tooth count of 71, the planet gears 132 may have a tooth count of 47, the planet gears 138 may have a tooth count of 31, and the ring gear 140 may have a tooth count of −133. In such a use-case example, the first gear ratio is 4.805, the second gear ratio is 2.873, the third gear ratio is 1.672, and the fourth gear ratio is 1.000. In this way, reasonable spreads between each of the four gear are achieved. Consequently, the gearbox achieves smoother shifting thereby enhancing the gearbox's performance. However, it will be appreciated that the gearbox gears may have different tooth counts, in alternate examples.

FIGS. 2A, 2B, 2C, and 2D show mechanical power paths 200, 202, 204, 206 that occur in the multi-speed gearbox 100 in the first operating gear, the second operating gear, the third operating gear, and the fourth operating gear, respectively. In each of FIGS. 2A, 2B, 2C, and 2D, the inverter 110 transfers electrical energy to the electric machine 108, shown in FIG. 1A and the traction motor generates mechanical power and inputs this power into the input shaft 120. However, as previously discussed the inverter may be omitted from the powertrain, in other embodiments.

The mechanical power path 200 shown in FIG. 2A, travels from the input shaft 120 to the sun gear 134 via the first clutch 144, from the sun gear 134, to the planet gears 132, from the planet gears 132 to the carrier 128, from the carrier 128 to the carrier 130, from the carrier 130 to the output shaft 118 via the fourth clutch 150.

Figure 2B:
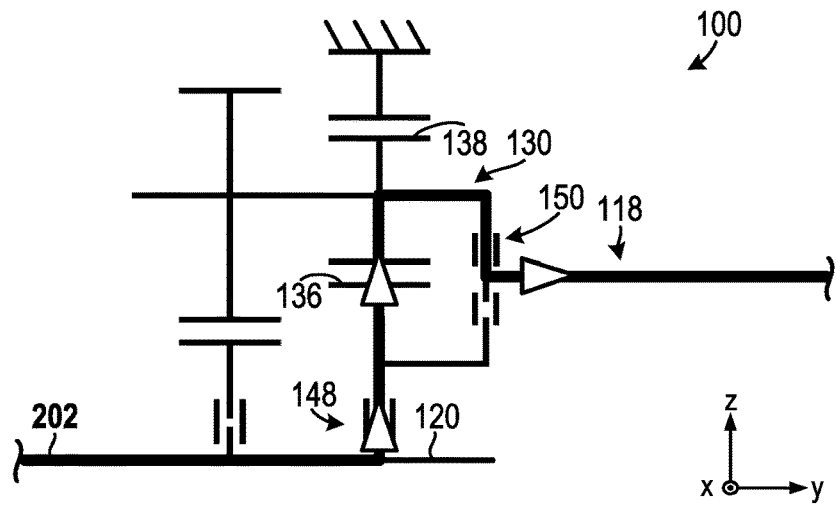

The mechanical power path 202 shown in FIG. 2B travels from the input shaft 120 to the sun gear 136 via the third clutch 148, from the sun gear 136 to the planet gears 138, from the planet gears 138 to the carrier 130, and from the carrier 130 to the output shaft 118 via the fourth clutch 150.

Figure 2C:
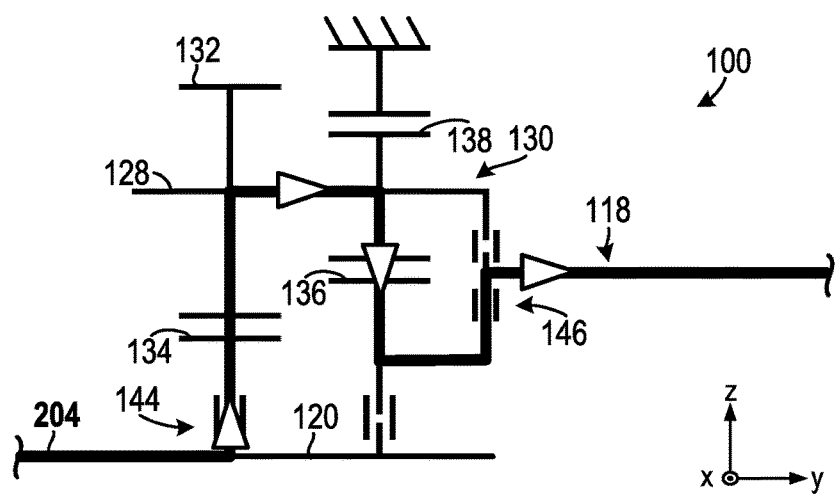

The mechanical power path 204 shown in FIG. 2C travels from the input shaft 120 to the sun gear 134 via the first clutch 144, from the sun gear 134 to the planet gears 132, from the planet gears 132 to the carrier 128, from the carrier 128 to the carrier 130, from the carrier 130 to the planet gears 138, from the planet gears 138 to the sun gear 136, and from the sun gear 136 to the output shaft 118 via the second clutch 146.

Figure 2D:
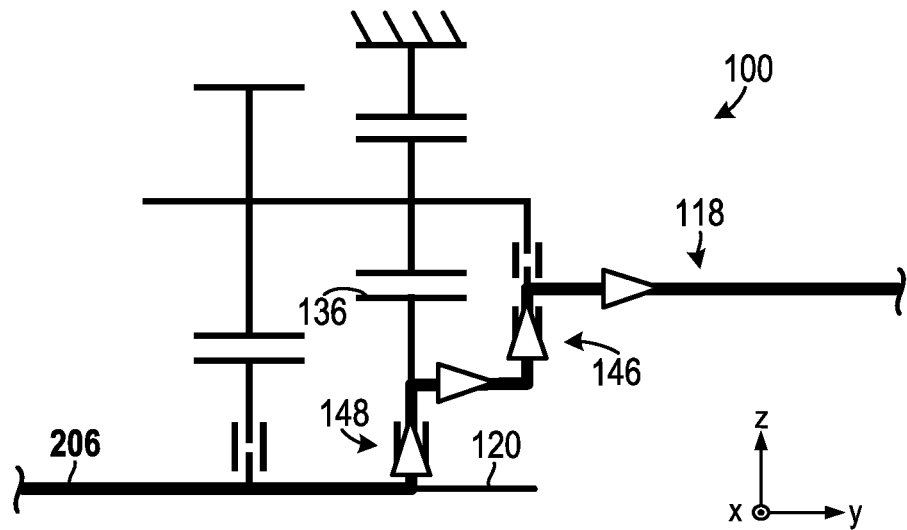

The mechanical power path 206 shown in FIG. 2D from the input shaft 120 to the sun gear 136 via the third clutch 148, from the sun gear 136 to the output shaft 118 via the second clutch 146.

Figure 3:
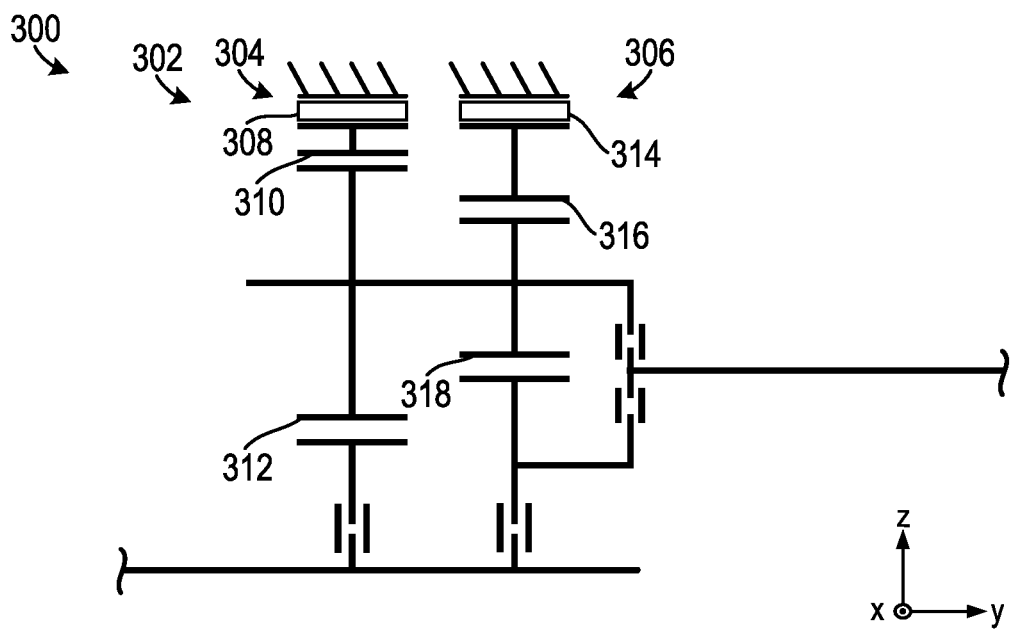
FIG. 3 shows another example of a multi-speed gearbox.

FIG. 3 shows another example of a multi-speed gearbox 300. The gearbox again includes a planetary assembly 302 with a first gear set 304 and a second gear set 306. As such, the multi-speed gearbox 300 includes components that overlap with the multi-speed gearbox 100 shown in FIG. 1A and redundant description is omitted for concision. However, the gearbox 300 shown in FIG. 3 includes a brake 308 that selectively grounds a ring gear 310 which meshes with the planet gears 312 in the first gear set 304 and another brake 314 that selectively grounds a ring gear 316 which meshes with the planet gears 318 in the second gear set 306. Incorporating the brakes into the gearbox enables the number of operating gears in the gearbox to be increased, if desired. Specifically, the gearbox 300 shown in FIG. 3 may be operated in six gears, if desired.

Figure 4A:
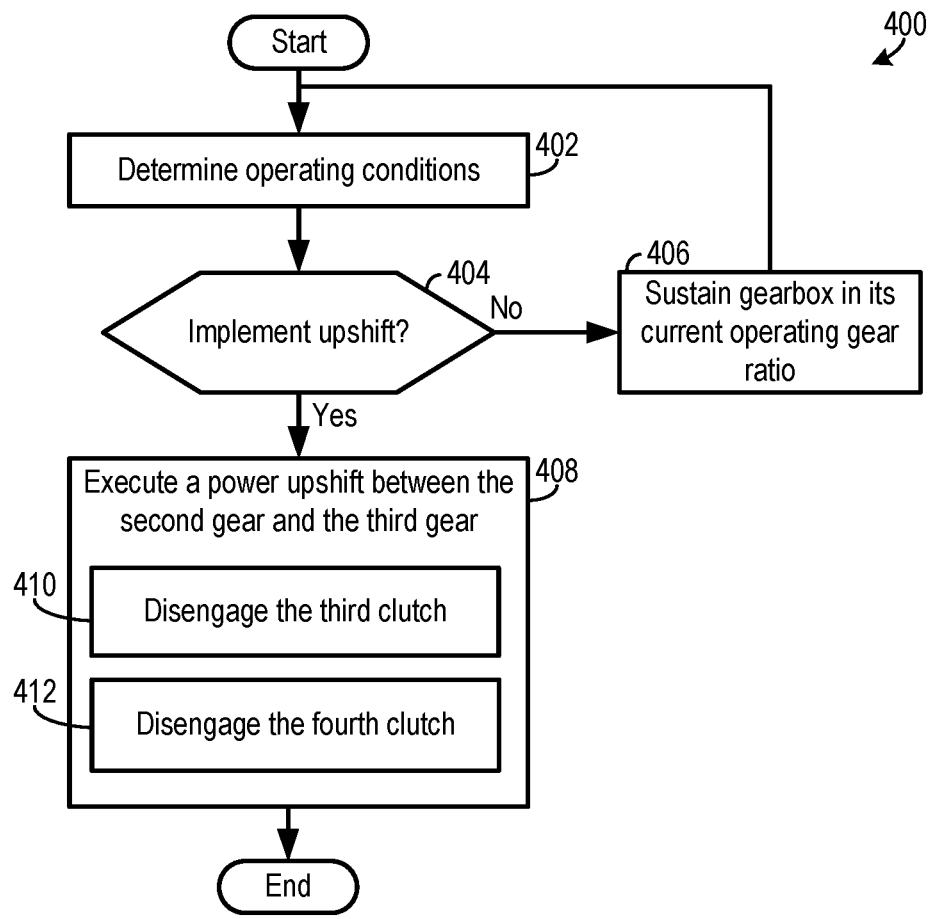
FIGS. 4A and 4B show shifting methods in a gearbox.
Figure 4B:
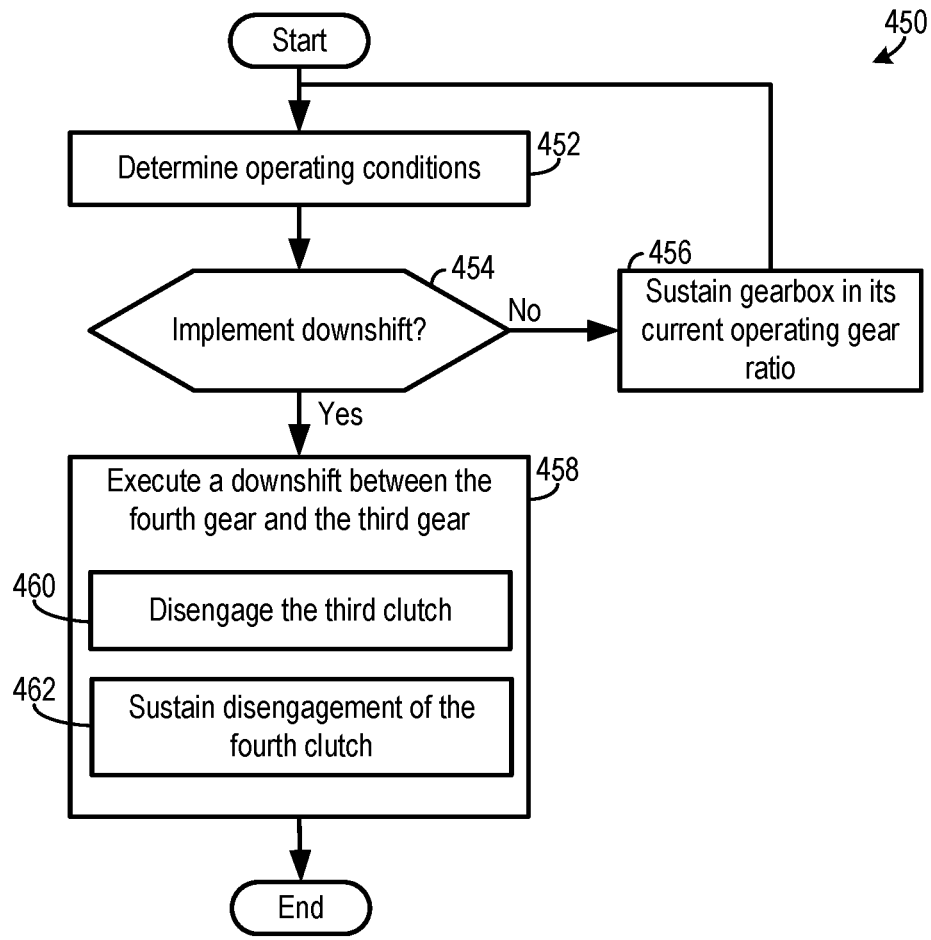

FIGS. 4A and 4B show methods 402 and 450, respectively, for operation of a multi-speed gearbox. Specifically, FIG. 4A shows an upshift method for shifting (e.g., power-shifting) into third gear and FIG. 4B conversely shows a downshift technique for shifting (e.g., powershifting) into third gear. The methods 400 and 450 may be carried out by the multi-speed gearbox 100 shown in FIG. 1A, in one example. In other examples, the methods may be implemented by other suitable gearboxes, or combinations of the gearboxes described herein. Furthermore, the methods 400 and 450 may be implemented by a controller that includes memory holding instructions for the method steps that are executable by a processor, as previously indicated. To elaborate, the multi-speed gearbox operating methods are implemented in a gearbox in which the third and fourth clutches are actively controlled clutches such as friction clutches, dog clutches, or synchronizers and the first and second clutches are one-way clutches. However, as previously discussed, the gearbox may exhibit other clutch architectures, in other examples.

The method 400 illustrated in FIG. 4A includes at 402, determining operating conditions. The operating conditions may include input device position (e.g., gearshift lever position), clutch configuration, accelerator pedal position, transmission input/output speed, motor speed, vehicle speed, vehicle load, ambient temperature, and the like. The operating conditions may be ascertained via sensor inputs, modeling, look-up tables, and/or other suitable techniques.

Next at 404, the method includes judging if an up-shift in the gearbox between the second gear and the third gear should be implemented. This determination may be automatically carried out responsive to vehicle speed exceeding a threshold value and/or vehicle load dropping below a threshold value, in one example. In other examples, operator interaction with gear selector may initiate the upshift.

If it is determined that an upshift should not occur (NO at 404) the method moves to 406 where the method includes sustaining the current transmission operating strategy. For instance, the transmission may be maintained in its current operating gear ratio (e.g., the second gear).

Conversely, if it is determined that an upshift should occur (YES at 404) the method moves to 408 where the method includes executing an upshift from the second gear to the third gear.

Executing the upshift includes steps 410-412. Steps 410-412 may occur at overlapping and in some cases concurrent times. At 410, the method includes disengaging the third clutch and at 412 the method includes disengaging the fourth clutch. This clutch engagement may be initiated via hydraulic actuators with pistons that receive pressurized fluid (e.g., oil) from a hydraulic system. However, in other examples, the friction clutches may be electromechanically actuated via solenoids, for instance. Responsive to the disengagement of the third and fourth clutches, the first and second clutches transition from disengaged configurations to engaged configurations. After 412, the method ends.

The method 450, shown in FIG. 4B, depicts a downshifting strategy. At 452, the method includes determining operating conditions. The operating conditions may be determined in a similar manner to step 402, shown in FIG. 4A.

Next, method 450 includes step 454 where the method includes determining if a downshift from a fourth operating gear to a third operating gear should be implemented. This determination may be automatically carried out responsive to vehicle speed decreasing below a threshold value and/or vehicle load increasing above a threshold value, in one example. In other examples, operator interaction with gear selector may initiate the power downshift.

If it is determined that a power downshift should not occur (NO at 454) the method moves to 456 where the method includes sustaining the current transmission operating strategy. For instance, the transmission may be maintained in its current operating gear ratio (e.g., the fourth gear ratio).

Conversely, if it is determined that a power upshift should occur (YES at 454) the method moves to 458 where the method includes executing a downshift from the fourth operating gear to the third operating gear. Executing the downshift includes steps 460-462. At 460, the method includes disengaging the third clutch and at 462 the method includes sustaining disengagement of the fourth clutch. Responsive to the disengagement of the third clutch, the first clutch transition from a disengaged configuration to an engaged configuration. After 462, the method ends. FIGS. 4A and 4B allow the gearbox to smoothly shift into the third operating gear in which the carrier in the second gear set functions as both the output and input for the gear set.

It will be appreciated that the other upshift and downshift between the other operating gears in the multi-speed gearbox may occur in a similar manner and the clutch control for the other shifts may be defined by the table 160, shown in FIG. 1B. Further, it will be understood, that the traction motor coupled to the multi-speed gearbox may be rotated in a common direction when the gearbox is operated in each of the gears. In other words, the motor's rotational direction can be sustained during shifting transient, thereby simplifying shifting operation and reducing the likelihood of torque interruptions.

The technical effect of the multi-speed gearbox operating methods described herein is to enhance shifting performance by using a gearbox with a desired ratio separation and packing efficiency. Consequently, gearbox and corresponding operating method may be used in wider variety of vehicle platforms FIGS. 1A, 2A, 2B, 2C, 2D, and 3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such. Even further, elements which are coaxial or parallel to one another may be referred to as such. Still further, an axis about which a component rotates may be referred to as a rotational axis.

The invention will be further described in the following paragraphs. In one aspect, a multi-speed gearbox is provided that comprises a planetary assembly including: a first gear set rotationally coupled to a second gear set; a first clutch configured to selectively couple a first sun gear of the first gear set to an input shaft configured to rotationally couple to an electric machine; and a second clutch configured to selectively couple a second sun gear of the second gear set to an output shaft.

In another aspect, a method for operation of a multi-speed gearbox is provided that comprises shifting between two gear stages in a group of at least four stages in the multi-speed gearbox via engaging or sustaining engagement of each of a first clutch and a second clutch; wherein the multi-speed gearbox includes: a planetary assembly including: a first gear set rotationally coupled to a second gear set; the first clutch configured to selectively couple a first sun gear of the first gear set to an input shaft; and the second clutch that is configured to selectively couple a second sun gear of the second gear set to an output shaft.

In yet another aspect, a multi-speed electric gearbox is provided that comprises a planetary assembly including: a first gear set including a first carrier directly coupled to a second carrier of a second gear set; a first clutch configured to selectively couple a first sun gear of the first gear set to an input shaft; a second clutch configured to selectively couple a second sun gear of the second gear set to an output shaft; a third clutch configured to selectively couple the input shaft to the second sun gear in the second gear set; and a fourth clutch configured to selectively couple a carrier of the second gear set to the output shaft.

In any of the aspects or combinations of the aspects, the second clutch may be a one-way clutch.

In any of the aspects or combinations of the aspects, the multi-speed gearbox may further include a third clutch configured to selectively couple the input shaft to the second sun gear in the second gear set.

In any of the aspects or combinations of the aspects, the third clutch may be a friction clutch.

In any of the aspects or combinations of the aspects, the multi-speed gearbox may further include a fourth clutch configured to selectively couple a carrier of the second gear set to the output shaft.

In any of the aspects or combinations of the aspects, the first gear set or the second gear set may not include a ring gear.

In any of the aspects or combinations of the aspects, a first carrier in the first gear set may be directly fixedly coupled to a second carrier in the second gear set.

In any of the aspects or combinations of the aspects, a ring gear of the second gear set or the first gear set may be grounded.

In any of the aspects or combinations of the aspects, the planetary assembly may include a first ring gear of the first gear set and a second ring gear of the second gear set and the multi-speed gearbox may include a first brake configured to selectively ground the first ring gear and a second brake designed ground the second ring gear.

In any of the aspects or combinations of the aspects, the multi-speed gearbox may be configured to operate in at least four distinct gear stages and the multi-speed gearbox may further include a controller including: instructions that when executed, during a forward drive mode, cause the controller to: rotate the electric machine a common direction in the first gear stage, the second gear stage, the third gear stage, and the fourth gear stage.

In any of the aspects or combinations of the aspects, shifting between two of the gear stages may include disengaging or sustaining disengagement of each of a third clutch and a fourth clutch in the multi-speed gearbox; the third clutch may be configured to selectively couple the input shaft to the second sun gear of the second gear set; and the fourth clutch may be configured to selectively couple a carrier the second gear set to the output shaft.

In any of the aspects or combinations of the aspects, shifting between the two gear stages may occur in a drive mode where a traction motor which is coupled to the multi-speed gearbox is rotated in one direction.

In any of the aspects or combinations of the aspects, the third clutch may be a friction clutch and the fourth clutch may be dog clutch or a friction clutch.

In any of the aspects or combinations of the aspects, the first clutch and the second clutch may be one-way clutches.

In any of the aspects or combinations of the aspects, a ring gear of the second gear set may be permanently grounded and the first gear set does not include a ring gear; or a ring gear of the first gear set may be permanently grounded and the second gear set does not include a ring gear.

In any of the aspects or combinations of the aspects, the multi-speed gearbox may further comprise a brake configured to selectively ground a first ring gear of the first gear set and a second ring gear of the second gear set.

In any of the aspects or combinations of the aspects, a shaft may be directly coupled to the second sun gear and the second clutch.

In any of the aspects or combinations of the aspects, the multi-speed electric gearbox may be configured to shift between only four discrete gear stages.

In another representation, a multi-speed transmission is provided that includes a multi-stage planetary assembly with a first planetary gear set and a second planetary gear set, a first clutch configured to selectively transmit mechanical power between a carrier and an output shaft and a second clutch configured to selectively transmit mechanical power between a sun gear and the output shaft.

Note that the example control and estimation routines included herein can be used with various powertrain, electric drive, and/or vehicle system configurations. The control methods and routines disclosed herein may be stored as executable instructions in non-transitory memory and may be carried out by the control system including the controller in combination with the various sensors, actuators, and other transmission and/or vehicle hardware in combination with the electronic controller. As such, the described actions, operations, and/or functions may graphically represent code to be programmed into non-transitory memory of the computer readable storage medium in the vehicle and/or powertrain control system. The various actions, operations, and/or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated actions, operations and/or functions may be repeatedly performed depending on the particular strategy being used. One or more of the method steps described herein may be omitted if desired.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to powertrains that include different types of propulsion sources including different types of traction motors, internal combustion engines, and/or transmissions. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A multi-speed gearbox, comprising:
   a planetary assembly including:
      a first gear set rotationally coupled to a second gear set;
      a first clutch configured to selectively couple a first sun gear of the first gear set to an input shaft configured to rotationally couple to an electric machine;
      a second clutch configured to selectively couple a second sun gear of the second gear set to an output shaft; and a third clutch configured to selectively couple the input shaft to the second sun gear in the second gear set.

2. The multi-speed gearbox of claim 1, wherein the second clutch is a one-way clutch.

3. The multi-speed gearbox of claim 1, wherein the third clutch is a friction clutch.

4. The multi-speed gearbox of claim 1, further comprising a fourth clutch configured to selectively couple a carrier of the second gear set to the output shaft.

5. The multi-speed gearbox of claim 1, wherein the first gear set or the second gear set does not include a ring gear.

6. The multi-speed gearbox of claim 1, wherein a first carrier in the first gear set is directly fixedly coupled to a second carrier in the second gear set.

7. The multi-speed gearbox of claim 1, wherein a ring gear of the second gear set or the first gear set is grounded.

8. The multi-speed gearbox of claim 1, wherein the planetary assembly includes a first ring gear of the first gear set and a second ring gear of the second gear set and the multi-speed gearbox includes a first brake configured to selectively ground the first ring gear and a second brake designed ground the second ring gear.

9. The multi-speed gearbox of claim 1, wherein the multi-speed gearbox is configured to operate in at least four distinct gear stages and the multi-speed gearbox further includes a controller including:
    instructions that when executed, during a forward drive mode, cause the controller to:
        rotate the electric machine a common direction in the first gear stage, the second gear stage, the third gear stage, and the fourth gear stage.

10. A method for operation of a multi-speed gearbox, comprising:
    shifting between two gear stages in a group of at least four stages in the multi-speed gearbox via engaging or sustaining engagement of each of a first clutch and a second clutch; and
    shifting between two of the gear stages includes disengaging or sustaining disengagement of each of a third clutch and a fourth clutch in the multi-speed gearbox;
    wherein the multi-speed gearbox includes:
    a planetary assembly including:
        a first gear set rotationally coupled to a second gear set;
        the first clutch that is configured to selectively couple a first sun gear of the first gear set to an input shaft; and
        the second clutch that is configured to selectively couple a second sun gear of the second gear set to an output shaft;
    wherein the third clutch is configured to selectively couple the input shaft to the second sun gear of the second gear set; and
    wherein the fourth clutch configured to selectively couple a carrier the second gear set to the output shaft.

11. The method of claim 10, wherein shifting between the two gear stages occurs in a drive mode where a traction motor which is coupled to the multi-speed gearbox is rotated in one direction.

12. A multi-speed electric gearbox, comprising:
    a planetary assembly including:
        a first gear set including a first carrier directly coupled to a second carrier of a second gear set;
        a first clutch configured to selectively couple a first sun gear of the first gear set to an input shaft;
        a second clutch configured to selectively couple a second sun gear of the second gear set to an output shaft;
        a third clutch configured to selectively couple the input shaft to the second sun gear in the second gear set; and
        a fourth clutch configured to selectively couple a carrier of the second gear set to the output shaft.

13. The multi-speed electric gearbox of claim 12, wherein the third clutch is a friction clutch and the fourth clutch is dog clutch or a friction clutch.

14. The multi-speed electric gearbox of claim 13, wherein the first clutch and the second clutch are one-way clutches.

15. The multi-speed electric gearbox of claim 12, wherein:
    a ring gear of the second gear set is permanently grounded and the first gear set does not include a ring gear; or
    a ring gear of the first gear set is permanently grounded and the second gear set does not include a ring gear.

16. The multi-speed electric gearbox of claim 12, further comprising a brake configured to selectively ground a first ring gear of the first gear set and a second ring gear of the second gear set.

17. The multi-speed electric gearbox of claim 12, wherein a shaft is directly coupled to the second sun gear and the second clutch.

18. The multi-speed electric gearbox of claim 12, wherein the multi-speed electric gearbox is configured to shift between only four discrete gear stages.

* * * * *